United States Patent [19]

Rozmus

[11] 4,337,880
[45] Jul. 6, 1982

[54] MEASURING AND DISPENSING ASSEMBLY

[75] Inventor: Walter J. Rozmus, Traverse City, Mich.

[73] Assignee: Kelsey-Hayes Company, Romulus, Mich.

[21] Appl. No.: 139,318

[22] Filed: Apr. 11, 1980

[51] Int. Cl.³ .............................................. G01F 11/34
[52] U.S. Cl. .................................... 222/152; 222/440; 222/447
[58] Field of Search ............... 222/152, 440, 435, 438, 222/439, 447, 450

[56] References Cited

U.S. PATENT DOCUMENTS

| | | | |
|---|---|---|---|
| 709,638 | 9/1902 | Johnson | 222/440 X |
| 1,469,879 | 10/1923 | Bott | 222/440 X |
| 1,595,822 | 8/1926 | Ducharme | 222/450 X |
| 1,611,840 | 12/1926 | Ralston . | |
| 2,162,404 | 6/1939 | Kerr | 222/440 X |
| 2,232,273 | 2/1941 | Risser | 222/440 |
| 2,366,343 | 1/1945 | Ludwig . | |
| 2,820,579 | 1/1958 | Roth | 222/440 |
| 3,101,159 | 8/1963 | Fletcher | 222/440 X |
| 3,176,729 | 4/1965 | Steiner | 222/440 X |
| 3,557,411 | 1/1971 | Ravasi | 222/152 X |
| 3,622,045 | 11/1971 | Delaney et al. | 222/152 X |

FOREIGN PATENT DOCUMENTS

| | | | |
|---|---|---|---|
| 548298 | 9/1956 | Italy | 222/447 |
| 46-29981 | 8/1971 | Japan | 222/152 |

Primary Examiner—Robert J. Spar
Assistant Examiner—Frederick R. Handren
Attorney, Agent, or Firm—McGlynn and Milton

[57] ABSTRACT

A measuring and dispensing assembly including a sealed housing defining a supply chamber with a measuring chamber immediately below the supply chamber. An outlet valve is disposed at the bottom of the measuring chamber and an inlet valve controls the flow of material from the supply chamber into the measuring chamber. The inlet valve has a cavity surrounding a control member which is movable into and out of the measuring chamber for changing the volume thereof. The inlet valve has a tubular portion extending upwardly and exteriorly of the housing for connection to an actuator. The control member for controlling the volume has a tubular section extending upwardly through the tubular portion of the inlet valve and exteriorly of the housing for connection to an adjustment means for varying the volume of the measuring chamber. The outlet valve has a stem extending upwardly through the tubular section of the control member exteriorly of the housing for connection to an actuator.

11 Claims, 1 Drawing Figure

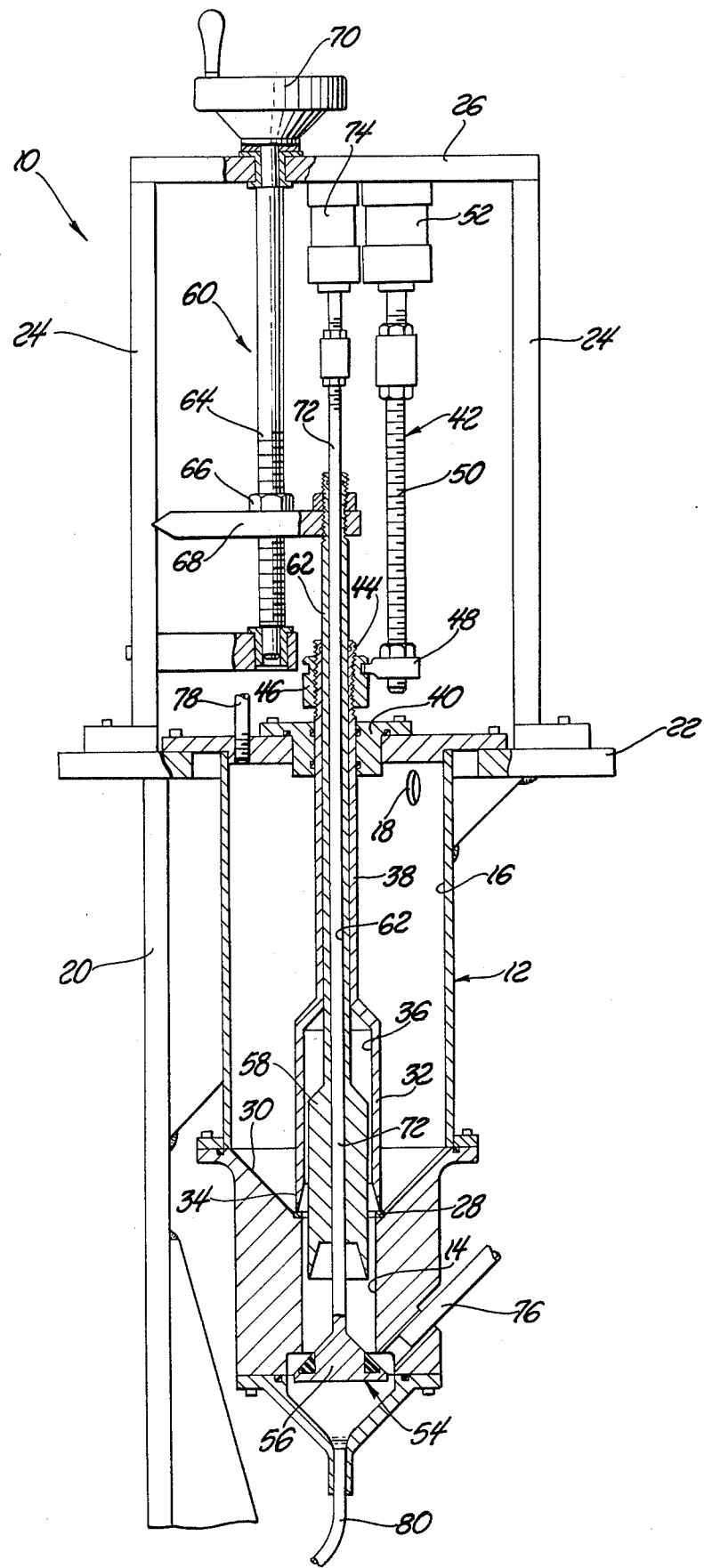

MEASURING AND DISPENSING ASSEMBLY

BACKGROUND OF THE INVENTION

(1) Field of the Invention

This invention relates to a measuring and dispensing assembly of the type for measuring and dispensing precise amounts of material such as powdered metal.

Powdered metal parts are made by fabricating a mold having a cavity the approximate shape of the part to be made and filling the cavity with powder metal and thereafter subjecting the mold to heat and pressure. As will be appreciated, different molds with different cavities are required for various different parts and, therefore, the amount of powdered metal required to fill the cavity from mold to mold will vary.

(2) Description of the Prior Art

There are assemblies known to the prior art for dispensing fixed volumes or quantities of material. There is not available, however, an assembly which will measure and dispense various different selected precise volumes or amounts of material.

SUMMARY OF THE INVENTION

The subject invention provides a measuring and dispensing assembly including housing means defining a measuring chamber with inlet valve means for controlling the flow of material into the measuring chamber and outlet valve means for controlling the flow of material out of the measuring chamber and volume control means for selectively varying the volume of the measuring chamber.

PRIOR ART STATEMENT

There are known in the prior art assemblies where a specified amount or volume of material may be measured and dispensed. Examples of such assemblies are disclosed in U.S. Pat. No. 1,611,840 granted to H. D. Ralston on Dec. 21, 1926 and U.S. Pat. No. 2,366,343 granted to C. L. Ludwig on Jan. 2, 1945. Although these assemblies may measure and dispense a specified volume of material, there is no provision for selectively varying the volume of the material to be measured and dispensed.

BRIEF DESCRIPTION OF THE DRAWING

The drawing shows an elevational view partially broken away and in cross section of the preferred embodiment of the subject invention.

DESCRIPTION OF THE PREFERRED EMBODIMENT

A measuring and dispensing assembly constructed in accordance with the subject invention is generally shown at 10.

The assembly 10 includes a housing means generally indicated at 12. The housing means 12 has a lower portion defining a measuring chamber 14 and an upper portion defining a supply chamber 16. Material such as powder metal may be conveyed into the supply chamber 16 through a supply duct 18. The housing 12 is supported by the support framework 20 which includes a plate 22 and structural members 24 and 26.

The assembly includes inlet valve means for controlling the flow of material into the measuring chamber 14 from the supply chamber 16. The inlet valve means includes a circular valve seat 28 about the upper end of the measuring chamber 14 which is also circular in cross section. The valve seat 28 is at the bottom of the supply chamber 16, the bottom of the supply chamber 16 being conical as indicated at 30 and terminating at the valve seat 28. The inlet valve means includes a valve member 32 having a valve periphery in the form of a knife edge 34 for engaging the valve seat 28 about the upper end of the measuring chamber 14 when in the closed position illustrated. The peripheral knife edge 34 is circular as is the valve seat 28. The valve seat 28 may be defined by a resilient or elastomeric material.

The valve member 32 defines a cavity 36 extending upwardly from the knife edge 34. The valve member includes a tubular portion 38 which extends upwardly from the top of the cavity 36 and through the member 40 of the housing means so as to be connected exteriorly of the housing means to a first actuator means generally indicated at 42. The tubular portion 38 is in sealed sliding engagement with the member 40 of the housing means and has an upper threaded end 42 having a nut member 46 threaded thereon and attached by connecting means 48 to a rod 50 which is moved by an actuator 52 such as a solenoid. The first actuator means 42 moves the valve member 32 between the closed position illustrated and an open position wherein the knife edge 34 would be spaced vertically above the valve seat 28 for allowing material to flow by gravity from the supply chamber 16 into the measuring chamber 14.

The assembly also includes outlet valve means generally indicated at 54 for controlling the flow of material out of the measuring chamber 14. The measuring chamber 14 is circular and the bottom periphery of the measuring chamber 14 defines a valve seat which coacts with a conical valve member 56 of the valve means 54. In other words, the bottom of the chamber 14 defines an outlet valve seat and the valve member 56 engages the outlet valve seat for closing the outlet from the measuring chamber 14.

The assembly 10 also includes volume control means for selectively varying the volume of the measuring chamber 14. The volume control means includes a control member 58 movable into and out of the measuring chamber 14 through the inlet thereto as defined by the valve seat 28. The volume control means also includes adjustment means generally indicated at 60 for adjusting the position of the control member 58 in the measuring chamber 14. The control member 58 is disposed within the valve periphery as defined by the knife edge 34 for movement into and out of the measuring chamber 14. The control member 58 is disposed for movement within the cavity 36 of the valve member 33. The control member 58 includes a tubular section 62 extending upwardly from the top of the cavity 36 and through the tubular portion 38 and is connected exteriorly of the housing means to the adjustment means 60. Specifically, the adjustment means 60 includes a threaded shaft 64 with a nut 66 thereon with the nut 66 connected to an indicator bar 68 which is, in turn, threaded onto the upper end of the tubular section 62. An adjustment wheel 70 of the well known type may be rotated to rotate the threaded shaft 64 to move the control member 58 vertically into and out of the measuring chamber 14 to change the volume of the measuring chamber 14. The indicator member 68 is associated with a scale indicating the volume of the measuring chamber 14.

The outlet valve means 54 includes a valve stem 72 extending upwardly from the conical valve portion 56 through the measuring chamber 14 and through the tubular section 62 and is connected exteriorly of the housing to a second actuator means including a second solenoid 74.

The measuring and supply chambers 14 and 16 are sealed and vacuum means are included for establishing a vacuum within the chambers 14 and 16 through the lines 76 and 78 respectively.

As will be appreciated, the supply chamber 16 may be filled with particulate material such as powder metal through the opening 18. The wheel 70 may be rotated to adjust the position of the control member 58 to a position which reflects the desired volume in the measuring chamber 14. The actuator means 42 is actuated to move the knife edge 34 upwardly from the seat 28. Material then flows into the measuring chamber 14 which is closed at the bottom by the valve means 54. The valve member 32 is then moved to the closed position and as it so moves, the knife edge 34 cuts through the particulate material and engages the valve seat 28. Thereafter, the valve member 56 is moved to the open position by actuation of the solenoid 74 whereby the material in the measuring chamber 14 is dispensed out through an outlet 80. In accordance with the subject invention, the outlet 80 is connected to a mold filling apparatus whereby the particulate material fills a cavity in a mold which will be used for making a part out of powder metal. Of course, if it is desirable to change the amount or volume of material dispensed from the measuring chamber 14, the position of the control member 58 is changed to vary the available volume in the measuring chamber 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A measuring and dispensing assembly (10) comprising; housing means (12) defining a measuring chamber (14), inlet valve means (28, 32) for controlling the flow of material into said measuring chamber (14), outlet valve means (54) for controlling the flow of material out of said measuring chamber (14), a control member (58) selectively movable into and out of said measuring chamber (14) to any one of various fixed adjusted positions for selectively varying the volume of said measuring chamber (14), and adjustment means (60) for selectively adjusting the fixed position of said control member (58) in said measuring chamber (14) so that said control member (58) remains stationary as said respective valve means (28, 32 and 54) open and close whereby said control member (58 may be moved to a fixed position in said measuring chamber (14) and remain there when said inlet valve means (28, 32) is open to fill said measuring chamber 14, said housing means (12) defining a supply chamber (16) above said measuring chamber (14), said inlet valve means (28, 32) being between said supply chamber (16) and said measuring chamber (14) and including a valve seat (28) about the upper end of said measuring chamber (14) and at the bottom of said supply chamber (16) and a valve member (32) having a valve periphery (34) for engaging said valve seat (28) about the upper end of said measuring chamber (14) when in the closed position, said control member (58) being disposed within said valve member (32) periphery (34) for movement into and out of said measuring chamber (14).

2. An assembly as set forth in claim 1 wherein said valve periphery (34) defines a knife edge.

3. An assembly as set forth in claim 2 including first actuator means (42) for moving said valve member (32) between the closed position and an open position for allowing material to flow from said supply chamber (16) to said measuring chamber (14).

4. An assembly as set forth in claim 3 wherein said outlet valve means (54) is disposed at the bottom of said measuring chamber (14) and including second actuator means (74) for moving said outlet valve means (54) between open and closed positions.

5. An assembly as set forth in claim 4 wherein the bottom of said supply chamber (16) is conical (30) about said valve seat (28).

6. An assembly as set forth in claim 5 wherein said valve seat (28) and said knife edge (34) are circular.

7. An assembly as set forth in claim 6 wherein said valve member (32) defines a cavity (36) extending upwardly from said knife edge (34), said control member (58) being disposed in said cavity (36).

8. An assembly as set forth in claim 7 wherein said valve member (32) includes a tubular portion (38) extending upwardly from the top of said cavity (36) and through said housing means (12) and connected (44, 46, 48) exteriorly of said housing means to said first actuator means (42), said control member (58) includes a tubular section (62) extending upwardly from said cavity (36) and through said tubular portion (38) and connected (66, 68) exteriorly of said housing means to said adjustment means (60), said outlet valve means (54) includes a valve stem (72) extending upwardly through said measuring chamber (14) and through said tubular section (62) of said control member (58) and connected exteriorly of said housing means to said second actuator means (74).

9. An assembly as set forth in claim 8 wherein said adjustment means (60) inclues indicator means (68) for indicating the position of said control member (58) so that the volume of said measuring chamber (14) may be determined.

10. An assembly as set forth in claim 9 wherein said measuring chamber (14) and said supply chamber (16) are sealed and including vacuum means (76, 78) for establishing a vacuum within said measuring (14) and supply (16) chambers.

11. An assembly as set forth in claim 10 wherein the bottom of said measuring chamber (14) defines an outlet valve seat and said outlet valve means (54) includes a conical valve member (56) for engaging said outlet valve seat.

* * * * *